(12) United States Patent
Thiruvenkatachari et al.

(10) Patent No.: US 9,319,915 B2
(45) Date of Patent: Apr. 19, 2016

(54) METHOD AND SYSTEM OF PROVIDING MDT MEASUREMENT INFORMATION TO A BASE STATION IN A WIRELESS NETWORK ENVIRONMENT

(75) Inventors: Balaji Srinivasan Thiruvenkatachari, Bangalore (IN); Himke Van Der Velde, Middlesex (GB); Nitin Jain, Bangalore (IN); Prateek Basu Mallick, Bangalore (IN)

(73) Assignee: Samsung Electronics Co., Ltd, Suwon-si (KR)

( * ) Notice: Subject to any disclaimer, the term of this patent is extended or adjusted under 35 U.S.C. 154(b) by 88 days.

(21) Appl. No.: 13/878,156

(22) PCT Filed: Oct. 5, 2011

(86) PCT No.: PCT/KR2011/007379
§ 371 (c)(1),
(2), (4) Date: Apr. 5, 2013

(87) PCT Pub. No.: WO2012/047025
PCT Pub. Date: Apr. 12, 2012

(65) Prior Publication Data
US 2013/0208616 A1    Aug. 15, 2013

(30) Foreign Application Priority Data
Oct. 5, 2010    (IN) ............ 2940/CHE/2010

(51) Int. Cl.
H04B 17/00    (2015.01)
H04W 24/10    (2009.01)
H04W 16/18    (2009.01)

(52) U.S. Cl.
CPC .............. *H04W 24/10* (2013.01); *H04W 16/18* (2013.01)

(58) Field of Classification Search
USPC ............ 370/252, 329; 455/67.11, 422.1, 425, 455/436, 466, 517
See application file for complete search history.

(56) References Cited

U.S. PATENT DOCUMENTS 8,340,659 B2 * 12/2012 Yi et al. ................... 455/425
2005/0009521 A1   1/2005 Preece
(Continued)

FOREIGN PATENT DOCUMENTS

CN    101690357 A    3/2010
JP    2013533683 A   8/2013
(Continued)

OTHER PUBLICATIONS

International Search Report dated Apr. 24, 2012 in connection with International Patent Application No. PCT/KR2011/007379, 3 pages.
(Continued)

*Primary Examiner* — Edan Orgad
*Assistant Examiner* — Sithu Ko (57) ABSTRACT

The present invention provides a method and system of providing minimization drive test (MDT) measurement information to a base station in a wireless communication network. In one embodiment, a method includes indicating availability of MDT measurement information logged by user equipment to a base station in a wireless network environment. The method further includes receiving an information request message to transfer the MDT measurement information in response to the indication. The method includes transmitting an information response message including at least a portion of the MDT measurement information to the base station, where the information response message indicates whether any portion of MDT measurement information is leftover with the user equipment. The method then includes repeating the above steps of receiving and transmitting till the entire MDT measurement information is transferred to the base station.

20 Claims, 5 Drawing Sheets

(56) References Cited

U.S. PATENT DOCUMENTS

| | | | |
|---|---|---|---|
| 2009/0268683 A1* | 10/2009 | Ho et al. | 370/329 |
| 2011/0183662 A1* | 7/2011 | Lee et al. | 455/422.1 |
| 2011/0306345 A1* | 12/2011 | Wu | 455/436 |
| 2012/0040621 A1* | 2/2012 | Jung et al. | 455/67.11 |
| 2013/0144551 A1 | 6/2013 | Zhou et al. | |
| 2013/0190031 A1* | 7/2013 | Persson et al. | 455/517 |

FOREIGN PATENT DOCUMENTS

| | | |
|---|---|---|
| RU | 2 378794 C2 | 1/2010 |
| WO | WO 2011/160274 A1 | 12/2011 |

OTHER PUBLICATIONS

3GPP TR 36.805, Study on Minimization of Drive-tests in Next Generation Networks, V9.0.0, 3rd Generation Partnership Project; Technical Specification Group Radio Access Network; Release 9, Dec. 2009, 24 pages.

Jani Puttonen et al.; "Coverage Optimization for Minimization of Drive Tests in LTE with Extended RLF Reporting", Personal Indoor and Mobile Radio Communications (PIMRC), 2010 IEEE 21st International Symposium, Sep. 26-30, 2010, pp. 1764-1768.

Nokia Corporation, Nokia Siemens Networks, "MDT Coverage and Capacity Optimization," 3GPP TSG-RAN WG2 Meeting 67bis contribution R2-095636, Oct. 2009, 6 pages.

"Max MDT Log Size"; 3GPP TSG RAN WG2 #71bis; R2-105799; Oct. 11-15, 2010; Xi'an, China; 3 pages.

"Introduction of Minimization of Drive Tests"; Nokia Corporation; 3Gpp TSG-RAN WG2 Meeting #71bis; R2-105879; Aug. 11-15, 2010; Xi'an, China; 36 pages.

"Memory Size and Signalling Amount"; CATT; 3GPP TSG RAN WG2 Meeting #71bis; R2-105332; Oct. 11-15, 2010; Xi'an, China; 2 pages.

"MDT Log Size Issues"; LG Electronics Inc.; 3GPP TSG RAN2 Meeting #71; Aug. 23-27, 2010; Madrid, Spain; 2 pages.

Decision on Grant of a Patent for Invention dated Aug. 21, 2015 in connection with Russian Patent Application No. 2013-120344/07(030150); 17 pages.

NTT Docomo, Inc.; "Logged MDT Report During Handover": 3GPP TSG-RAN2#71; R2-104668; Aug. 23-17, 2010; Madrid, Spain; 3 pages.

* cited by examiner

METHOD AND SYSTEM OF PROVIDING MDT MEASUREMENT INFORMATION TO A BASE STATION IN A WIRELESS NETWORK ENVIRONMENT

CROSS-REFERENCE TO RELATED APPLICATION(S)

The present application claims priority under 35 U.S.C. §365 to International Patent Application No. PCT/KR2011/007379 filed Oct. 5, 2011, entitled "METHOD AND SYSTEM OF PROVIDING MDT MEASUREMENT INFORMATION TO A BASE STATION IN A WIRELESS NETWORK ENVIRONMENT". International Patent Application No. PCT/KR2011/007379 claims priority under 35 U.S.C. §365 and/or 35 U.S.C. §119(a) to Indian Patent Application No. 2940/CHE/2010 filed Oct. 5, 2010 and which are incorporated herein by reference into the present disclosure as if fully set forth herein.

TECHNICAL FIELD

The present invention relates to the field of wireless communication, and more particularly relates to providing minimization drive test (MDT) measurement information to a base station.

BACKGROUND ART

Minimization Drive Test (MDT) is used for reducing drive test efforts by retrieving measurement and positioning information from active user equipments in a wireless network. MDT benefits the network operators to reduce operational cost involved in frequent drive tests.

Typically, a base station configures UEs for MDT campaign based on a configuration shared by a MDT server. Accordingly, each UE performs the MDT in both radio resource connection (RRC) idle and connected modes and the UE periodically logs the MDT data in the IDLE mode based on the MDT configuration received while in RRC Connected mode. The MDT log data includes radio condition measurement information perceived by the UE along with available location and time information associated with the radio measurements. The location information available with the UE can be Global Navigation Satellite System information or radio frequency fringerprint information of neighbouring cells.

As an example, in third generation partnership project (3GPP) long term evolution (LTE), in RRC connected mode, the UE instantaneously reports the MDT log data to the base station. Whereas in idle mode, the UE logs the MDT data with periodicity in terms of their DRX cycles as specified in the received MDT configuration. Ideally, a UE configured for MDT logging shall indicate presence of MDT log data to the base station during transitions to the connected mode. The base station then retrieves the MDT log data buffered by the UE during the idle mode using RRC signalling, i.e., in LTE using information transfer procedure UE transfers the MDT log data to the base station and henceforth to the MDT server for network optimizations.

UE information is a request response procedure in which uplink response message uses the same transaction ID as indicated in DL request message. The UE is thereby allowed to transfer the MDT log data equal to a size of packet data convergence protocol (PDCP) service data unit (SDU) in a UL response message. The size of the PDCP SDU in LTE for transfer of a single RRC message is 8188 bytes.

DISCLOSURE OF INVENTION

Technical Problem

Size of the MDT log data buffered during the idle or connected state may be greater than 8188 bytes. Also, the base station is not aware of size of MDT log data available with the UE. As a consequence, the base station may fail to successfully retrieve the entire MDT log data buffered during the idle or connected state of UE due to PDCP size constraint.

Solution to Problem

The present invention provides A method of providing minimization drive test (MDT) measurement information to a base station, comprising: indicating availability of MDT measurement information logged by user equipment (UE) to a base station in a wireless network environment; receiving an information request message to transfer the MDT measurement information in response to the availability indication; transmitting an information response message including at least a portion of the MDT measurement information to the base station, wherein the response message indicates whether any portion of MDT measurement information is leftover with the user equipment; and repeating the steps of receiving and transmitting till the entire MDT measurement information is transferred to the base station.

In another aspect, The present invention provides An apparatus comprising: a processor; and a memory coupled to the processor, wherein the memory comprises a MDT log module configured for: indicating availability of logged minimization drive test (MDT) measurement information to a base station in a wireless network environment; receiving an information request message to transfer the MDT measurement information in response to the indication; transmitting an information response message including at least a portion of the MDT measurement information to the base station, wherein the response message indicates availability of a leftover portion of MDT measurement information; and repeating the steps of receiving and transmitting till the entire MDT measurement information is transferred to the base station.

In another aspect, The present invention provides a method of providing minimization drive test (MDT) measurement information to a base station, comprising: indicating availability of MDT measurement information and size of the MDT measurement information to a base station in a wireless network environment; receiving an information request message to transfer the MDT measurement information in response to the indication; transmitting an information response message including at least a portion of the MDT measurement information to the base station; and repeating the steps of receiving and transmitting till the entire MDT measurement information is transferred to the base station.

In another aspect, The present invention provides 13 an apparatus comprising: a processor; and a memory coupled to the processor, wherein the memory comprises a MDT log module configured for: indicating availability of MDT measurement information and size of the MDT measurement information to a base station in a wireless network environment; receiving an information request message to transfer the MDT measurement information in response to the indication; transmitting an information response message including at least a portion of the MDT measurement information to the base station; and repeating the steps of receiving and transmitting till the entire MDT measurement information is transferred to the base station.

MODE FOR THE INVENTION

The present invention provides a method and system of providing minimization test drive (MDT) measurement information to a base station in a wireless communication environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
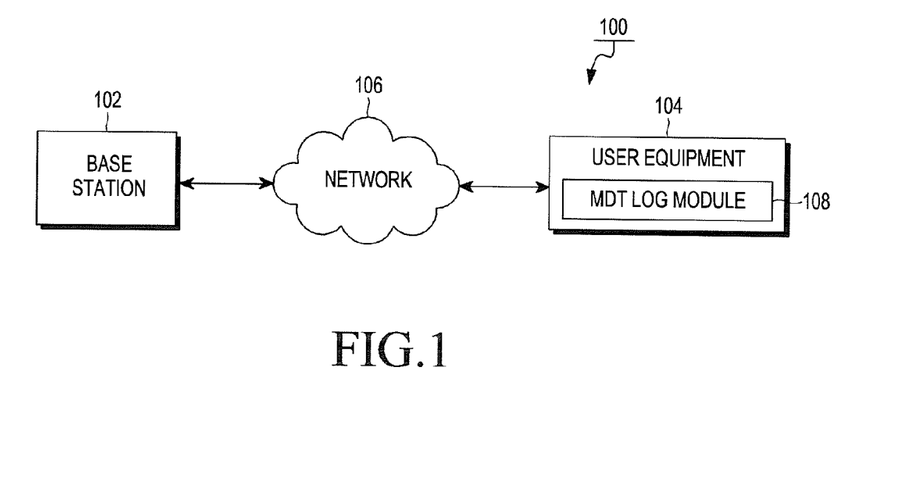
FIG. 1 illustrates a block diagram of a wireless communication system capable of providing minimization drive test (MDT) measurement information to a base station, according to one embodiment.

FIG. 1 illustrates a block diagram of a wireless communication system 100 capable of providing MDT measurement information to a base station, according to one embodiment. In FIG. 1, the wireless communication system 100 includes a base station 102 and a user equipment (UE) 104 coupled to the base station 102 via a network 106 (e.g., long term evolution (LTE) based network).

The UE 104 includes a MDT log module 108 for providing the complete MDT measurement information to the base station 102. For example, the MDT measurement information includes radio measurements associated with location and timing information. In one embodiment, the MDT log module 108 communicates size of MDT measurement information while indicating availability of the MDT measurement information to the base station 102 as illustrated in detail in FIG. 2. In another embodiment, the MDT log module 108 communicates availability of leftover MDT measurement information while transferring a portion of the MDT measurement information as illustrated in detail in FIG. 3. In yet another embodiment, the MDT log module 108 indicates absence of the MDT measurement information when the complete MDT measurement information is transferred to the base station 102 and no more MDT measurement information is available with the UE 102 as illustrated in detail in FIG. 4.

Figure 2:
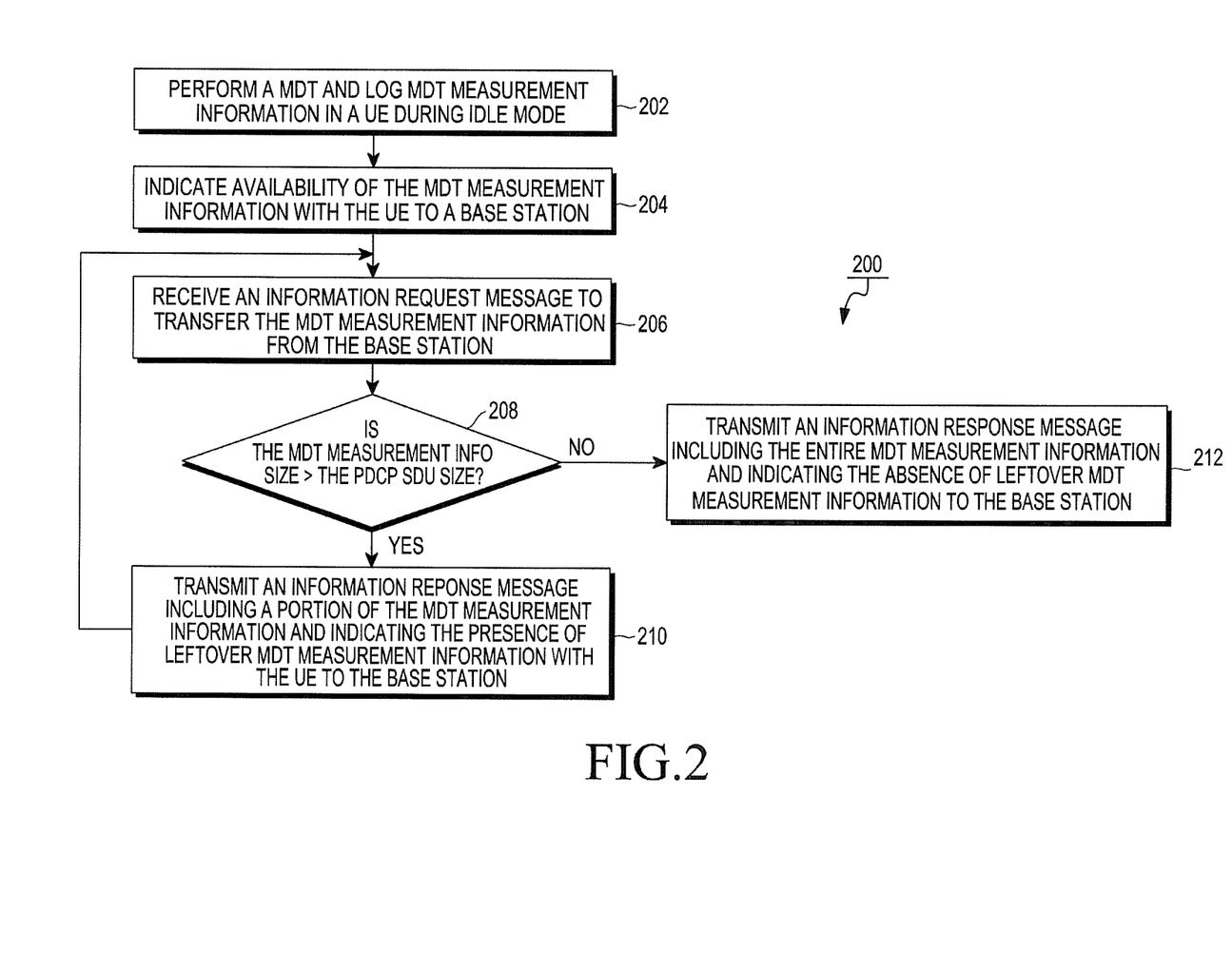
FIG. 2 is a process flowchart illustrating an exemplary method of providing MDT measurement information to the base station, according to one embodiment.

FIG. 2 is a process flowchart 200 illustrating an exemplary method of providing MDT measurement information to the base station 102, according to one embodiment. At step 202, a MDT is performed and MDT measurement information is logged in the UE 104 during the idle mode of the UE 104. At step 204, availability of the MDT measurement information with the UE 104 is indicated to the base station 102. The availability of the MDT measurement information is indicated when the UE 104 moves to the connected mode from the idle mode. The indication of availability of the MDT measurement information is sent in radio resource connection (RRC) set up complete message during connection establishment/re-establishment procedure or a handover procedure, or any other message specific to a radio access technology.

Based on the indication, a UE information transfer procedure is initiated by the base station. At step 206, an information request message (e.g., UE information response message) to transfer the MDT measurement information is received from the base station 102. At step 208, it is determined whether size of the MDT measurement information logged in the UE 104 is greater than a total size of a single packet data convergence protocol (PDCP) service data unit (SDU). If it is determined true, then at step 210, an information response message (e.g., UE information response message) including a portion of the MDT measurement information is transmitted to the base station 102 and indicating the presence of leftover MDT measurement information with the UE 104. For example, the information response message includes a MDT log field indicating that the information response message includes a portion of the MDT measurement information and remaining MDT measurement information is available with the UE 104. The MDT log field may be a bit, Boolean field or any other type of information element. In one exemplary implementation, the MDT log field is set to TRUE if the portion of MDT measurement information is leftover with the UE 104. Upon step 210, the process is routed back to step 206 and the steps 206-210 are repeated till the entire MDT measurement information is transferred to the base station 102.

If the determination is false, then at step 212, an information response message including a portion of the MDT measurement information is transmitted to the base station 102 and indicating the absence of any more MDT measurement information with the UE 104. For example, the information response message includes a MDT log field indicating that the information response message includes the entire MDT measurement information and no more MDT measurement information is available with the UE 104. In another exemplary implementation, the MDT log field is set to FALSE if there is no MDT measurement information leftover with the UE 104.

Figure 3:
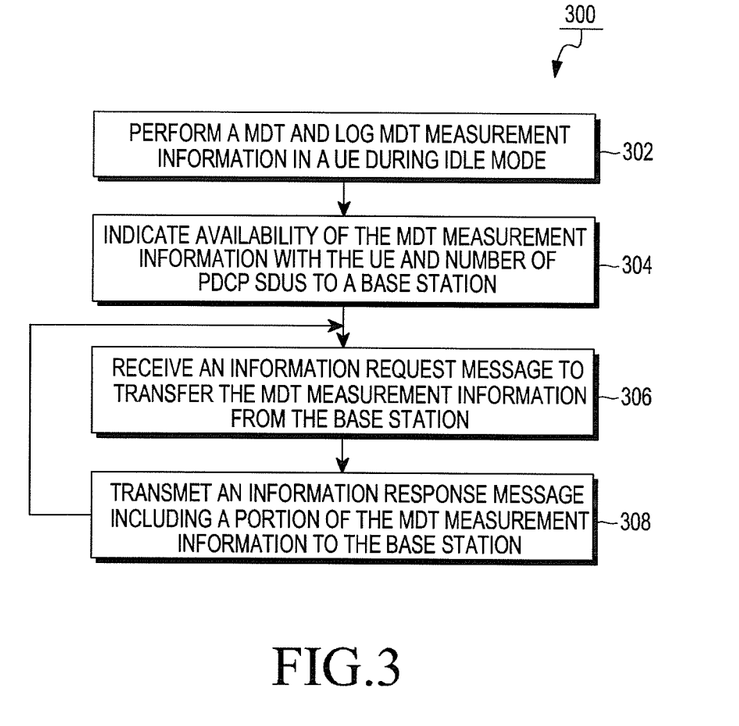
FIG. 3 is a process flowchart illustrating an exemplary method of providing MDT measurement information to the base station, according to another embodiment.

FIG. 3 is a process flowchart 300 illustrating an exemplary method of providing MDT measurement information to the base station 102, according to another embodiment. At step 302, a MDT is performed and MDT measurement information is logged in the UE 104 during the idle mode of the UE 104. At step 304, availability of the MDT measurement information with the UE 104 and number of PDCP SDUs required to transfer the MDT measurement information is indicated to the base station 102. The availability of the MDT measurement information is indicated when the UE 104 moves to the connected mode from the idle mode. The indication of availability of the MDT measurement information is sent in a radio resource connection (RRC) set up complete message during connection establishment/re-establishment procedure or a handover procedure, or any other message specific to a radio access technology.

When the UE 104 moves to the connected mode, the UE 104 determines the total size of the MDT measurement information logged during the idle mode. Based on the total size, the UE 104 determines number of PDCP SDUs required for transferring the entire MDT measurement information to the base station 102. In other words, the UE 104 determines the number of UE information transfer procedures need to be repeated by the base station 102 to transfer the entire MDT measurement information. Thus, the base station 102 is aware of the number of UE information transfer procedures required to retrieve the MDT measurement information. Also, the base station 102 is aware of UE's idle mode buffer storage capacity such that the base station 102 can decide whether to extract MDT measurement information or leave the UE 104 for further logging. The prior knowledge of the number of procedural exchange required may assist in scheduling the retrieval of the MDT measurement information logged in the UE 104.

At step 306, an information request message to transfer the MDT measurement information is received from the base station 102. At step 308, an information response message including a portion of the MDT measurement information is transmitted to the base station 102. Upon step 308, the process is routed back to step 306 and the steps 306-308 are repeated till the entire MDT measurement information is transferred to the base station 102.

Figure 4:
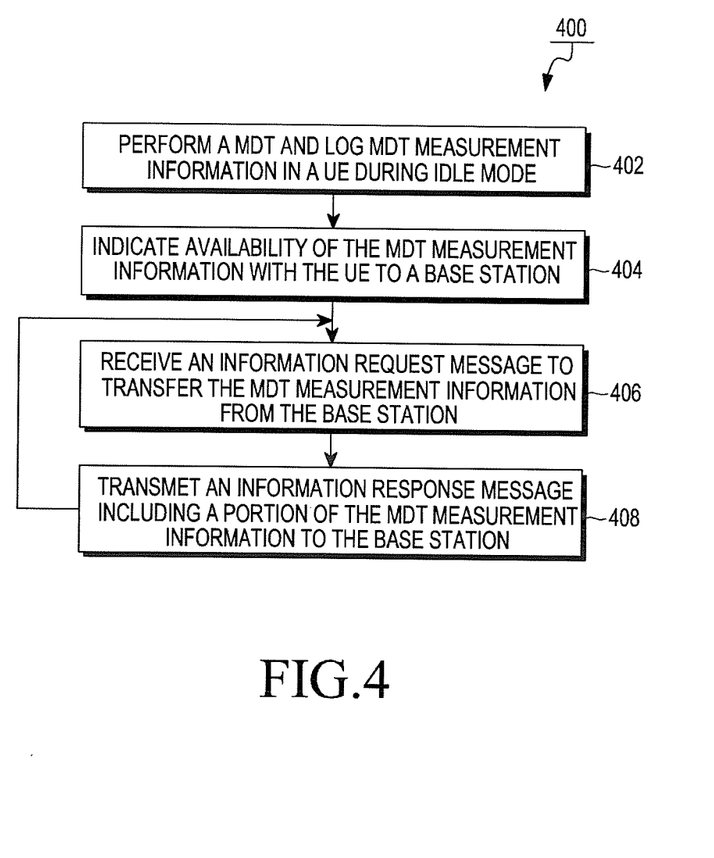
FIG. 4 is a process flowchart illustrating an exemplary method of providing MDT measurement information to the base station, according to yet another embodiment.

FIG. 4 is a process flowchart 400 illustrating an exemplary method of providing MDT measurement information to the base station 102, according to yet another embodiment. At step 402, a MDT is performed and MDT measurement information is logged in the UE 104 during the idle mode of the UE 104. At step 404, availability of the MDT measurement information with the UE 104 is indicated to the base station 102. The indication of availability of the MDT measurement information is sent in a radio resource connection (RRC) set up complete message during connection establishment/re-establishment procedure or a handover procedure, or any other message specific to a radio access technology.

At step 406, an information request message to transfer the MDT measurement information is received from the base station 102. At step 408, an information response message including a portion or entire MDT measurement information is transmitted to the base station 102. Upon step 408, the process is routed back to step 406 and the steps 406-408 are repeated till the entire MDT measurement information is transferred to the base station 102. The base station 102 sends the information request till the UE 104 sends the information response with no MDT measurement information. When the MDT measurement information absent in the information response, the base station 102 understands that the UE 104 does not have any more MDT measurement information to transfer.

Figure 5:
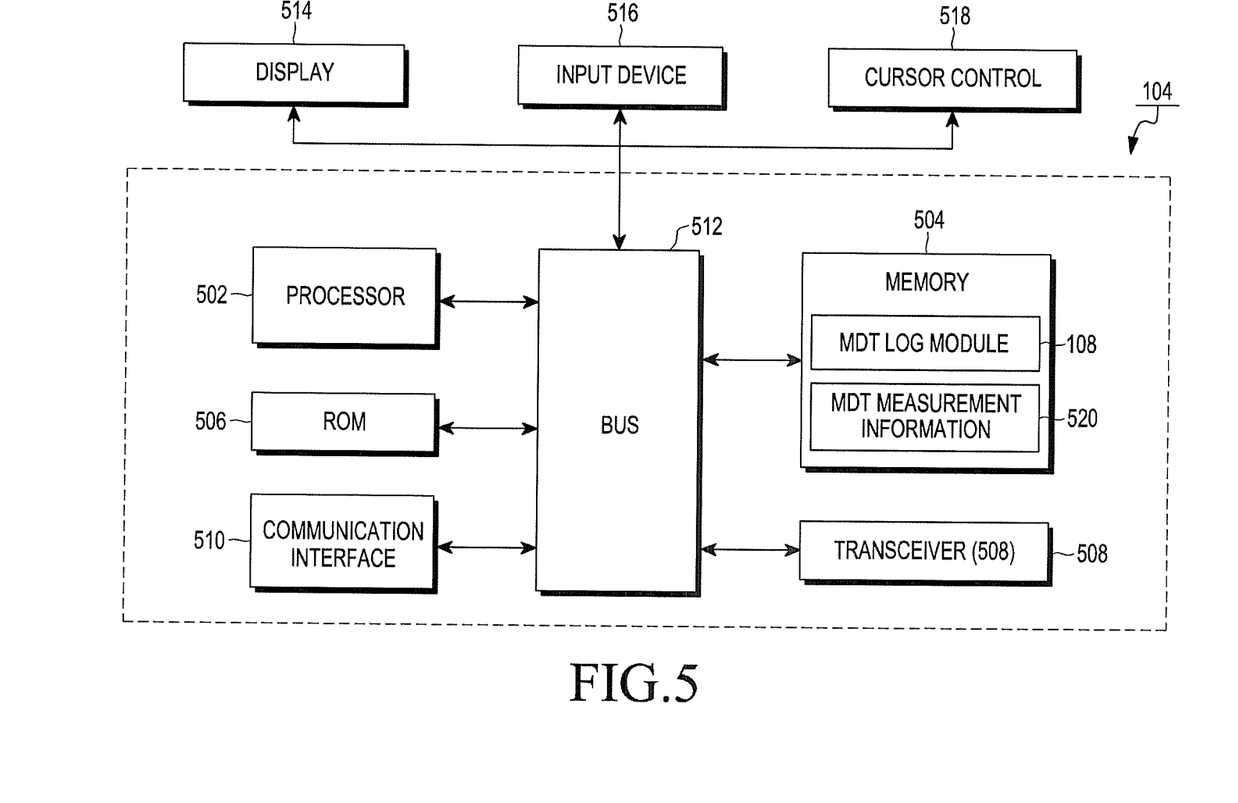
FIG. 5 illustrates a block diagram of the user equipment showing various components for implementing embodiments of the present subject matter.

FIG. 5 illustrates a block diagram of the UE 104 showing various components for implementing embodiments of the present subject matter. In FIG. 5, the UE 104 includes a processor 502, memory 504, a read only memory (ROM) 506, a transceiver 508, a bus 510, a communication interface 512, a display 514, an input device 516, and a cursor control 518.

The processor 502, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 502 may also include embedded controllers, such as generic or programmable logic devices or arrays, application specific integrated circuits, single-chip computers, smart cards, and the like.

The memory 504 may be volatile memory and non-volatile memory. The memory 504 includes a MDT log module 108 in the form of instructions stored therein to provide the complete MDT measurement information 520 logged in the UE 102 to the base station 102, according to the embodiments of the present subject matter. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory SticksTM, and the like.

Embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 502. For example, a computer program may include machine-readable instructions capable of providing the complete MDT measurement information 520 to the base station 102, according to the teachings and herein described embodiments of the present subject matter. In one embodiment, the computer program may be included on a storage medium and loaded from the storage medium to a hard drive in the non-volatile memory.

The components such as the transceiver 508, communication interfaces 512, the display 514, the input device 516, and the cursor control 518 are well known to the person skilled in the art and hence the explanation is thereof omitted.

The present embodiments have been described with reference to specific example embodiments, it will be evident that various modifications and changes may be made to these embodiments without departing from the broader spirit and scope of the various embodiments. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method of providing minimization of drive test (MDT) measurement information to a base station by a user equipment (UE), the method comprising:
    receiving a UE information request message to transfer logged MDT measurement information;
    determining whether a portion of the logged MDT measurement information is left over with the UE based on a total size of the logged MDT measurement information and a total size of a single packet data convergence protocol (PDCP) service data unit (SDU);
    transmitting a UE information response message including a MDT log field indicating that the logged MDT measurement information is available with the UE if the portion of the logged MDT measurement information is left over with the UE,
    wherein the MDT log field is set to TRUE.

2. The method of claim 1, further comprising:
    if the portion of the logged MDT measurement information is not left over with the UE, indicating an absence of left over MDT measurement information in the UE information response message.

3. The method of claim 1, further comprising:
repeating the receiving, the determining, and the transmitting until all of the MDT measurement information is transferred to the base station.

4. The method of claim 1, wherein the total size of the logged MDT measurement information available with the UE is greater than the total size of the PDCP SDU.

5. The method of claim 2, wherein indicating the absence of the left over MDT measurement information in the UE information response message comprises:
setting the MDT log field to FALSE if no more MDT measurement information is available with the UE.

6. A user equipment (UE) for providing minimization of drive test (MDT) measurement information to a base station, the UE comprising:
a processor; and
a memory coupled to the processor, wherein the memory comprises a MDT log module, wherein the processor is configured to execute one or more instructions of the MDT log module to cause the UE to:
receive a UE information request message to transfer logged MDT measurement information;
determine whether a portion of the logged MDT measurement information is left over with the UE based on a total size of the logged MDT measurement information and a total size of a single packet data convergence protocol (PDCP) service data unit (SDU); and
transmit a UE information response message including a MDT log field indicating that the logged MDT measurement information is available with the UE if the portion of the logged MDT measurement information is left over with the UE,
wherein the MDT log field is set to TRUE.

7. The UE of claim 6, wherein the UE is further configured to:
if the portion of the logged MDT measurement information is not left over with the UE, indicate an absence of left over MDT measurement information in the UE information response message.

8. The UE of claim 7, wherein in indicating the absence of the left over MDT measurement information in the UE information response message, the UE is configured to set the MDT log field to FALSE if no more MDT measurement information is available with the UE.

9. A method of providing minimization of drive test (MDT) measurement information to a base station by user equipment (UE), the method comprising:
indicating an availability of the MDT measurement information and a number of packet data convergence protocol (PDCP) service data units (SDUs) required to transfer all of the MDT measurement information to the base station;
receiving a UE information request message to transfer the MDT measurement information in response to the indication;
transmitting a UE information response message including at least a portion of the MDT measurement information and a field that indicates availability of additional MDT measurement information left over with the UE to the base station; and
repeating the receiving and the transmitting until all of the MDT measurement information is transferred to the base station.

10. The method of claim 9, wherein indicating the availability of MDT measurement information and the number of PDCP SDUs to the base station comprises:
determining a total size of the MDT measurement information available with the UE;
computing the number of PDCP SDUs required for transferring all of the MDT measurement information to the base station based on the determination.

11. A user equipment (UE) capable of providing minimization of drive test (MDT) measurement information to a base station, the UE comprising:
a processor; and
a memory coupled to the processor, wherein the memory comprises a MDT log module, wherein the processor is configured to execute one or more instructions of the MDT log module to cause the UE to:
indicate an availability of MDT measurement information and a number of packet data convergence protocol (PDCP) service data units (SDUs) required to transfer all of the MDT measurement information to the base station;
receive a UE information request message to transfer the MDT measurement information in response to the indication;
transmit a UE information response message including at least a portion of the MDT measurement information and a field that indicates availability of additional MDT measurement information left over with the UE to the base station; and
repeat the receipt and transmission until all of the MDT measurement information is transferred to the base station.

12. The UE of claim 11, wherein in indicating the availability of MDT measurement information and the number of PDCP SDUs to the base station, the UE is configured to:
determine a total size of the MDT measurement information available with the UE;
compute the number of PDCP SDUs required for transferring all of the MDT measurement information to the base station based on the determination.

13. The UE of claim 11, wherein the UE is further configured to:
determine whether a portion of the MDT measurement information is left over;
if so, indicate a presence of left over MDT measurement information in the information response message; and
if not, indicate an absence of left over MDT measurement information in the information response message.

14. The UE of claim 13, wherein the information response message includes a MDT log field to indicate the presence or absence of leftover MDT measurement information.

15. The method of claim 9, further comprising:
determining whether a portion of the MDT measurement information is leftover with the user equipment;
if so, indicating a presence of the leftover MDT measurement information in the information response message; and
if not, indicating an absence of leftover MDT measurement information in the information response message.

16. The method of claim 15, wherein the information response message includes a MDT log field to indicate the presence or absence of leftover MDT measurement information.

17. The UE of claim 6, wherein in setting the MDT field to TRUE when the portion of the MDT measurement information is leftover, the total size of MDT measurement information available with the UE is greater than the total size of the single PDCP SDU.

18. The method of claim 1, wherein in setting the MDT field to TRUE when the portion of the MDT measurement information is leftover, the total size of MDT measurement information available with the UE is greater than the total size of the single PDCP SDU.

19. The method of claim 16, wherein the MDT log field is set to FALSE if no more MDT measurement information is available with the UE.

20. The UE of claim 6, wherein the UE is configured to repeat the receiving, determining and transmitting until all of the MDT measurement information is transferred to the base station.

* * * * *